US012220708B2

(12) United States Patent
Bergh

(10) Patent No.: US 12,220,708 B2
(45) Date of Patent: Feb. 11, 2025

(54) METHOD FOR PRODUCING AN IONIZATION ROD, AND IONIZATION ROD PRODUCED ACCORDING TO THE METHOD

(71) Applicant: RENLUFTSTEKNIK I GÖTEBORG AB, Gothenburg (SE)

(72) Inventor: Lennart Bergh, Vastra Frolunda (SE)

(73) Assignee: RENLUFTSTEKNIK I GÖTEBORG AB, Gothenburg (SE)

( * ) Notice: Subject to any disclaimer, the term of this patent is extended or adjusted under 35 U.S.C. 154(b) by 394 days.

(21) Appl. No.: 17/766,350

(22) PCT Filed: Oct. 5, 2020

(86) PCT No.: PCT/SE2020/000025
§ 371 (c)(1),
(2) Date: Apr. 4, 2022

(87) PCT Pub. No.: WO2021/066693
PCT Pub. Date: Apr. 8, 2021

(65) Prior Publication Data

US 2022/0355312 A1 Nov. 10, 2022

(30) Foreign Application Priority Data

Oct. 4, 2019 (SE) .................................... 1930311-4

(51) Int. Cl.
*B03C 3/38* (2006.01)
*A61L 9/22* (2006.01)
(Continued)

(52) U.S. Cl.
CPC .................. *B03C 3/41* (2013.01); *B03C 3/64* (2013.01); *B03C 2201/08* (2013.01)

(58) Field of Classification Search
CPC ........... B03C 3/41; B03C 3/38; B03C 3/0175; B03C 2201/08; B03C 2201/10;
(Continued)

(56) References Cited

U.S. PATENT DOCUMENTS 5,949,635 A * 9/1999 Botez ...................... H01T 19/04 361/220

FOREIGN PATENT DOCUMENTS

CN 207038930 U 2/2018
EP 1155834 A2 * 11/2001 ............... B65H 5/00
(Continued)

OTHER PUBLICATIONS

International Search Report and Written Opinion of the ISA/SE dated Oct. 12, 2020 in International Application No. PCT/SE2020/000025, 9pgs.

*Primary Examiner* — Minh Chau T Pham
(74) *Attorney, Agent, or Firm* — Haukaas Fortius PLLC; Paul K. Judd; Michael Haukaas

(57) ABSTRACT

The present invention relates to a method for producing an ionization rod and an ionization rod produced according to the method. The invention is characterized in that in a U-shaped duct profile (1) a main line (4) for supply current is placed, in that from this main line branch lines (3) are connected with adjacent carbon fibre brushes held in protective sleeves and in that a thermosetting plastic are laid into the duct profile covering the main part of the protective sleeves.

2 Claims, 3 Drawing Sheets

Figure 1:
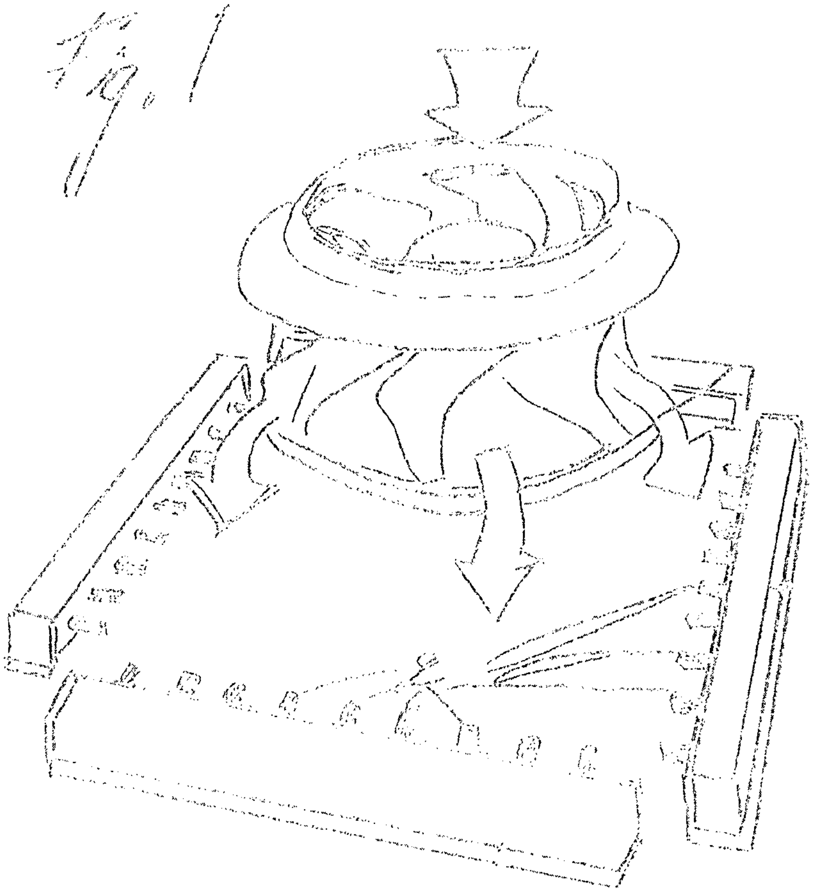

(51) Int. Cl.

| | |
|---|---|
| ***B03C 3/41*** | (2006.01) |
| ***B03C 3/64*** | (2006.01) |
| ***F24F 1/0353*** | (2019.01) |
| ***F24F 8/192*** | (2021.01) |
| ***F24F 8/30*** | (2021.01) |

(58) Field of Classification Search
CPC .. B08B 6/00; A61L 9/22; F24F 1/0353; F24F 8/30; F24F 8/192
USPC .... 55/385.1, 385.6; 361/230, 231, 233, 213, 361/220–222; 96/71; 250/324–326
See application file for complete search history.

(56) References Cited

FOREIGN PATENT DOCUMENTS

| | | | | |
|---|---|---|---|---|
| SE | 522070 | C2 * | 1/2004 | ............... B03C 3/49 |
| WO | 2014007558 | A1 | 1/2014 | |
| WO | 2014185682 | A1 | 11/2014 | |
| WO | 2018189928 | A1 | 10/2018 | |

* cited by examiner 1
2
3
4

METHOD FOR PRODUCING AN IONIZATION ROD, AND IONIZATION ROD PRODUCED ACCORDING TO THE METHOD

RELATED APPLICATIONS

This application is a national stage application filed under 35 U.S.C. § 371 of International Application No. PCT/SE2020/000025 filed Oct. 5, 2020, which claims the benefit of Swedish Patent Application No. 1930311-4 filed Oct. 4, 2019, which applications are incorporated herein by reference in their entirety.

The present invention relates to a method for producing an ionization rod and ionization rod produced according to the method.

Ionization rods are used to transfer electrical charges to the environment. In this case, an electric voltage is applied to the rods. If there is a negative dc voltage, positive charges are created around the electrical lines included in the rods. If a positive dc voltage is applied to the ionization rods, negative charges are created around said electrical lines in the rods. When an ac voltage is applied to the rods, positive and negative charges are alternately created.

When ionization, the air is filled with positively and negatively charged ions that adhere molecules contained in pollutants and then causes these to effectively pack together into large neutral particle clusters which in turn quickly sink to the floor. There they will be easy to clean up. Ions also clear the air by oxidizing volatile organic pollutants and gas molecules that cause odours. Mould spores, bacteria and viruses are also incapacitated by the positively and negatively charged ions created in the indoor air.

To make it easier for the created charges in the ionization rods to be emitted to the surroundings, brush deflections are made from the main lines of the ionization rods. The ends of these brush deflections will then be exposed to an air stream that draws the charges from the brush ends. The lengths of the brush ends and the flow rate of the air are such that the filaments will move (flutter) to facilitate the release of the existing charges.

Both filter and fan are given an ability to break the particles and thus create several smaller particles that are either positively or negatively charged. Owing to this these smaller particles gets a greater attractive ability to particles of opposite charge and will therefore more easily form clusters or agglomerates.

An example of products that need to be manufactured in premises free from pollution is headlamps for vehicles. Modern headlights often have gas discharge lamps with built-in sensitive electronics and operate under high voltages. Dust and other impurities must therefore, as far as possible, be eliminated in premises where these products are manufactured and assembled. This is to eliminate that the impurities are conversed/sputtered and deposited on the inside of reflectors and glass, creating defective or diffuse light images of the finished headlamp.

Another example of the importance of clean air is in egg and chicken production. In locations for free laying hens equipped with air purification techniques, egg production was increased by one egg per week per hen. In the poultry fattening, the utilization of food was more effective, and the rearing time could be shortened. Health was significantly improved and the number of dead chickens during rearing could be significantly reduced. Similar effects have also been observed in the rearing of slaughter pigs.

It is previously known to increase the ionization rate of indoor air. Various techniques have been used and most often the ions have been created by electric current being fed to ionization rods. These rods may be located in ventilation ducts, whereby air passing the rods carry with it the free ions that the rods are forming during power supply.

By using ac voltage at the generation of ions, in addition to negative ions, positive ions will also occur. Depending on the type of molecules in the pollutants you wish to remove, both negative and positive ions thus will be able to link to the electron shells, either in such a way that an electron in the molecule/atom is removed or added. In this way, the impurities in which the molecule is contained, become charged, and are then easily flocked with the molecules of the opposite charged pollutants and become heavier and are deposited.

The purpose of this invention is therefore to specify a method to produce an ionization rod.

This purpose is achieved by that the method has obtained the characteristics referred to in the claims.

By bringing the air to flow over and past several separately placed ionization rods and into the room via one or more openings, a concentration of more than 1000 ions per cubic centimetre of indoor air will occur, neutralizing or eliminating possibly electrostatic charges.

Figure 2:
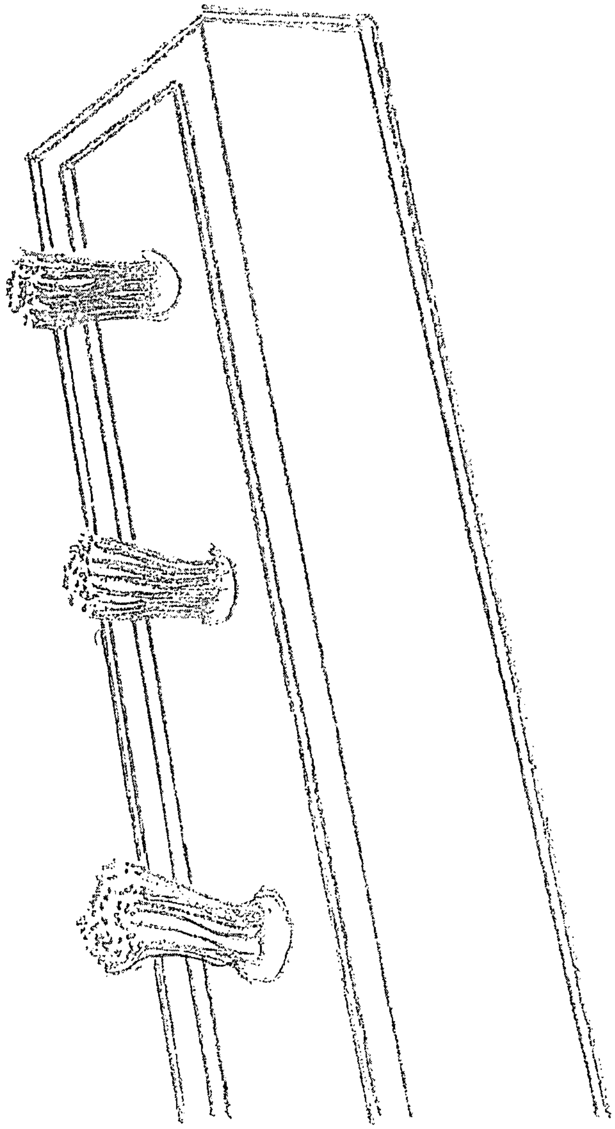

The invention should now be described in connection with the embodiments shown in the accompanying drawing sheet, where FIG. 1 schematically shows a module that includes the ionization rod according to the invention, FIG. 2 shows several ion rods according to FIG. 1 in its positions in a fan unit included in the module, and where FIG. 3, in the upper part shows a section through the ion rod and where the lower part is a side view of the ionization rod.

In FIG. 1 is accordingly schematically shown how the airflow through the module occurs. The airflow must be so adapted, via the selection of flow opening areas in and out of the module, that it reaches from only 20 cubic meters of air per hour—in bedrooms—to an air flow through rate of 5000 cubic meters of air per hour. The outflow opening is smaller than the inflow opening, which helps to create an overpressure over the fan unit to increase the separation of agglomerated pollutants.

FIG. 2 shows the position of the ion rods in relation to the fan unit. The ion rods are accordingly located in a position where the flow direction is deflected to an axial flow through direction. It can be noted here that the brush ends of carbon fibre of the ionization rods are optimally exposed to the airflow. This ensures that the ions formed are effectively carried by the passing air. The ion rods can also be positioned so that the brush ends are directed perpendicular to the airflow. In both cases, the carrying of generated electrical charges is facilitated.

Figure 3:
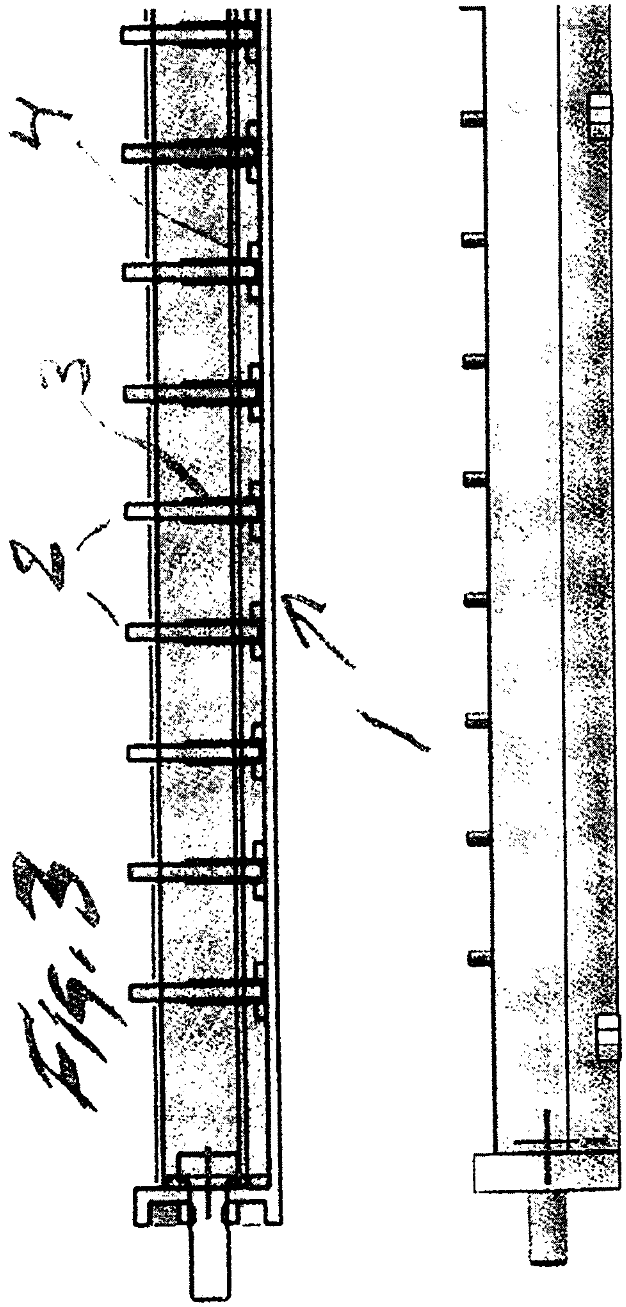

FIG. 3 shows the ionization rod used in the present invention. Here the main line is protectively placed in an open channel profile. To the main line have been connected branch lines that support the brush ends of carbon fibre. The carbon fibres are collected in a sleeve where the electrical connection to the main line is ensured. The duct rail is filled with polyurethane or epoxy in such a way that the carbon fibre brushes are kept intact, i.e. do not comes into contact with this filling.

The invention is not limited to the above-mentioned embodiments, but modifications can be made within the scope of the following specified claims.

The invention claimed is:

1. Method for producing an ionization rod comprising placing a main line for a supply current into a U-shaped duct, connecting the main line to adjacent carbon fibre brushes via main line branch lines, wherein the carbon fibre brushes are held in protective sleeves, and laying a thermosetting plastic into the U-shaped duct to cover part of the protective sleeves such that the carbon fibre brushes do not come into contact with one another during the laying of the thermosetting plastic.

2. Ionization rod produced according to the method of claim 1, wherein the ionization rod comprises a U-shaped duct, an active main line centrally located within the U-shaped duct, sleeves accommodating carbon fibre brushes positioned within the U-shaped duct, main branch lines electrically connecting the carbon fibre brushes to the main line; and a thermosetting plastic filling the U-shaped duct, thereby enclosing the sleeves.

* * * * *